(12) United States Patent
Straeter

(10) Patent No.: US 8,196,379 B2
(45) Date of Patent: Jun. 12, 2012

(54) CHOPPER ASSEMBLY FOR A HARVESTING IMPLEMENT

(76) Inventor: James E. Straeter, Rochester, IN (US)

( * ) Notice: Subject to any disclaimer, the term of this patent is extended or adjusted under 35 U.S.C. 154(b) by 0 days.

(21) Appl. No.: 13/012,090

(22) Filed: Jan. 24, 2011

(65) Prior Publication Data

US 2011/0113743 A1 May 19, 2011

Related U.S. Application Data

(63) Continuation-in-part of application No. 12/868,985, filed on Aug. 26, 2010, now Pat. No. 8,087,223, which is a continuation-in-part of application No. 12/420,494, filed on Apr. 8, 2009, now Pat. No. 7,856,800.

(51) Int. Cl.
*A01D 45/02* (2006.01)
(52) U.S. Cl. ................... 56/60; 56/500; 56/503
(58) Field of Classification Search ............... 56/3, 13.9, 56/14.5, 192, 60, 61, 500, 503–505; 460/112
See application file for complete search history.

(56) References Cited

U.S. PATENT DOCUMENTS

| | | | |
|---|---|---|---|
| 2,484,802 A | 10/1949 | Aasland | |
| 2,527,786 A | 10/1950 | Barkstrom | |
| 2,634,569 A | 4/1953 | Russell et al. | |
| 2,877,616 A | 3/1959 | Gewalt et al. | |
| 2,952,109 A | 9/1960 | Lambert | |
| 3,208,206 A | 9/1965 | Lundell | |
| 3,583,134 A | 6/1971 | Kemper et al. | |
| 3,599,404 A | 8/1971 | Fernandez et al. | |
| 3,680,291 A | 8/1972 | Soteropulos | |
| 3,762,137 A | 10/1973 | Veretto | |
| 3,984,966 A | 10/1976 | Outtier | |
| 4,083,167 A | 4/1978 | Lindblom et al. | |
| 4,148,175 A | 4/1979 | Miller | |
| 4,182,098 A | 1/1980 | Kass | |
| 4,251,980 A | 2/1981 | Miller | |
| 4,373,536 A | 2/1983 | Da Silva | |
| 4,510,948 A | 4/1985 | Dekeyzer | |
| 4,581,878 A | 4/1986 | Vida et al. | |
| 4,594,842 A | 6/1986 | Wolters et al. | |
| 4,622,804 A | 11/1986 | Krone et al. | |
| 4,637,406 A * | 1/1987 | Guinn et al. | ............ 460/112 |
| 4,691,505 A | 9/1987 | Browne | |
| 4,926,623 A | 5/1990 | Fiener | |
| 5,052,170 A | 10/1991 | Trenkamp et al. | |
| 5,330,114 A | 7/1994 | Trenkamp et al. | |
| 5,875,622 A | 3/1999 | Stoll | |
| 6,073,429 A | 6/2000 | Wuebbels et al. | |

(Continued)

OTHER PUBLICATIONS

Non-Final Office Action dated Jun. 24, 2009; U.S. Appl. No. 12/420,494, filed Apr. 8, 2009; United States Patent and Trademark Office; Alexandria, VA USA.

(Continued)

*Primary Examiner* — Alicia Torres
(74) *Attorney, Agent, or Firm* — Zarley Law Firm, P.L.C.

(57) ABSTRACT

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

11 Claims, 9 Drawing Sheets

U.S. PATENT DOCUMENTS

| | | |
|---|---|---|
| 6,412,259 B1 | 7/2002 | Wiegert |
| 6,415,590 B1 * | 7/2002 | Lohrentz .................. 56/192 |
| 7,047,717 B1 | 5/2006 | Wolters et al. |
| 7,063,614 B2 | 6/2006 | Vogelgesang et al. |
| 7,823,372 B1 * | 11/2010 | Kraus ....................... 56/192 |
| 2007/0037621 A1 | 2/2007 | Isfort |

OTHER PUBLICATIONS

Timothy J. Zarley; Amendment in Response to Non-Final Office Action filed Jul. 30, 2009; U.S. Appl. No. 12/420,494, filed Apr. 8, 2009; Des Moines, Iowa USA.

Final Office Action dated Dec. 11, 2009; U.S. Appl. No. 12/420,494, filed Apr. 8, 2009; United States Patent and Trademark Office; Alexandria, VA USA.

Attorney William Tinker; Interview Summary dated May 3, 2010; U.S. Appl. No. 12/420,494, filed Apr. 8, 2009; United States Patent and Trademark Office; Alexandria, VA USA.

Timothy J. Zarley; Request for Continued Examination (RCE) Under 37 C.F.R. 1.114 filed May 10, 2010; U.S. Appl. No. 12/420,494, filed Apr. 8, 2009; Des Moines, Iowa USA.

Non-Final Office Action dated May 27, 2010; U.S. Appl. No. 12/420,494, filed Apr. 8, 2009; United States Patent and Trademark Office; Alexandria, VA USA.

Timothy J. Zarley; Amendment in Response to Non-Final Office Action filed Aug. 17, 2010; U.S. Appl. No. 12/420,494, filed Apr. 8, 2009; Des Moines, Iowa USA.

Attorney William Tinker; Examiner-Initiated Interview Summary date of Interview Oct. 12, 2010; Examiner's Amendment dated Oct. 12, 2010; U.S. Appl. No. 12/420,494, filed Apr. 8, 2009; United States Patent and Trademark Office; Alexandria, VA USA.

Non-Final Office Action dated Oct. 7, 2010; U.S. Appl. No. 12/868,985, filed Aug. 26, 2010; United States Patent and Trademark Office; Alexandria, VA USA.

Timothy J. Zarley; Amendment in Response to Non-Final Office Action filed Jan. 7, 2011; U.S. Appl. No. 12/868,985 filed Aug. 26, 2010; Des Moines, Iowa USA.

* cited by examiner

US 8,196,379 B2

CHOPPER ASSEMBLY FOR A HARVESTING IMPLEMENT

CROSS REFERENCE TO A RELATED APPLICATION

This application is a continuation-in-part of U.S. patent application Ser. No. 12/868,985 filed Aug. 26, 2009 which is a continuation-in-part of U.S. patent application Ser. No. 12/420,494 filed Apr. 8, 2009.

FIELD OF THE INVENTION

This invention relates to a chopper assembly. More particularly, this invention relates to a chopper assembly for a harvesting implement.

BACKGROUND OF THE INVENTION

Harvesting corn is well known in the art. Conventionally, corn pickers remove the ears from the stalks and process those ears on through the machine, while leaving the stalks flattened against the ground and secured to their root structure. The stalks left in this condition are difficult to pick up and utilize for corn fodder, silage or biomass. To improve upon this, devices have been developed that not only remove the ears of corn from the stalks, but also cut the stalks and put them into a windrow whereupon they can be easily picked up and utilized as desired, such as by being processed through a chopping machine.

While these devices have provided some improvement in the art, there are still deficiencies preventing commercial adoption. To begin, these devices require many moving parts, are complex to manufacture, and are susceptible to wear. In addition, the devices are built into the machine and therefore are difficult to remove and repair. Finally, because these devices are built into the machines they are not adaptable for use on different corn heads for desired applications. Accordingly, there exists a need in the art for a device that addresses these deficiencies.

Therefore, an object of the present invention is to provide a chopping assembly for a harvesting implement that has fewer moving parts.

Another objective is to provide a dedicated chopper/transport assembly for each individual row without impacting adjacent rows.

Yet another object of the present invention is to provide a chopping device for a harvesting implement that is removable.

A still further object of the present invention is to provide a chopping assembly for a harvesting implement that is adaptable to different sized corn headers.

These and other objects, features, or advantages of the present invention will become apparent from the specification and claims.

SUMMARY OF THE INVENTION

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

DETAILED DESCRIPTION OF THE PREFERRED EMBODIMENT

Figure 1:
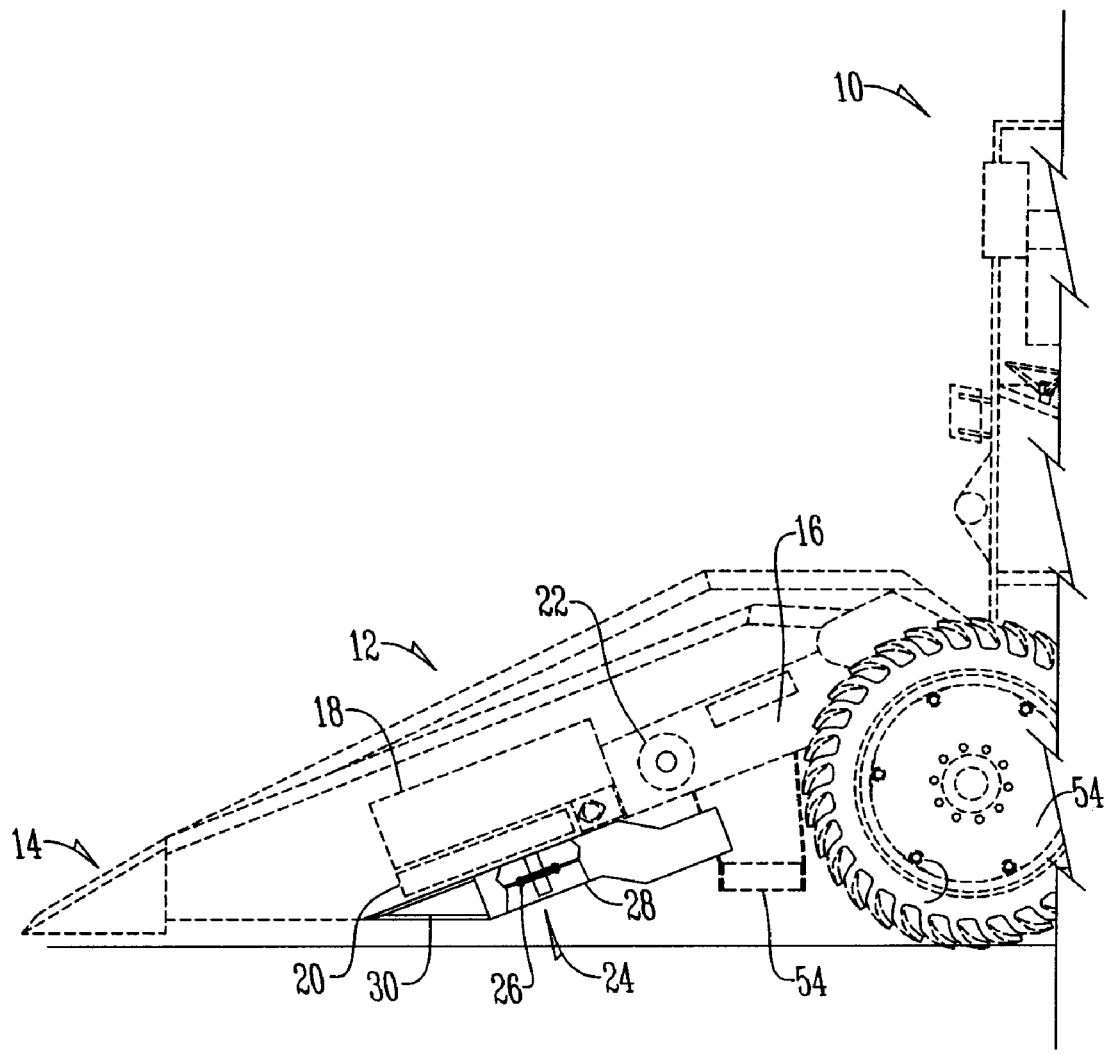
FIG. 1 is a side elevational view of a combine having a corn head with an attached chopper assembly.
Figure 2:
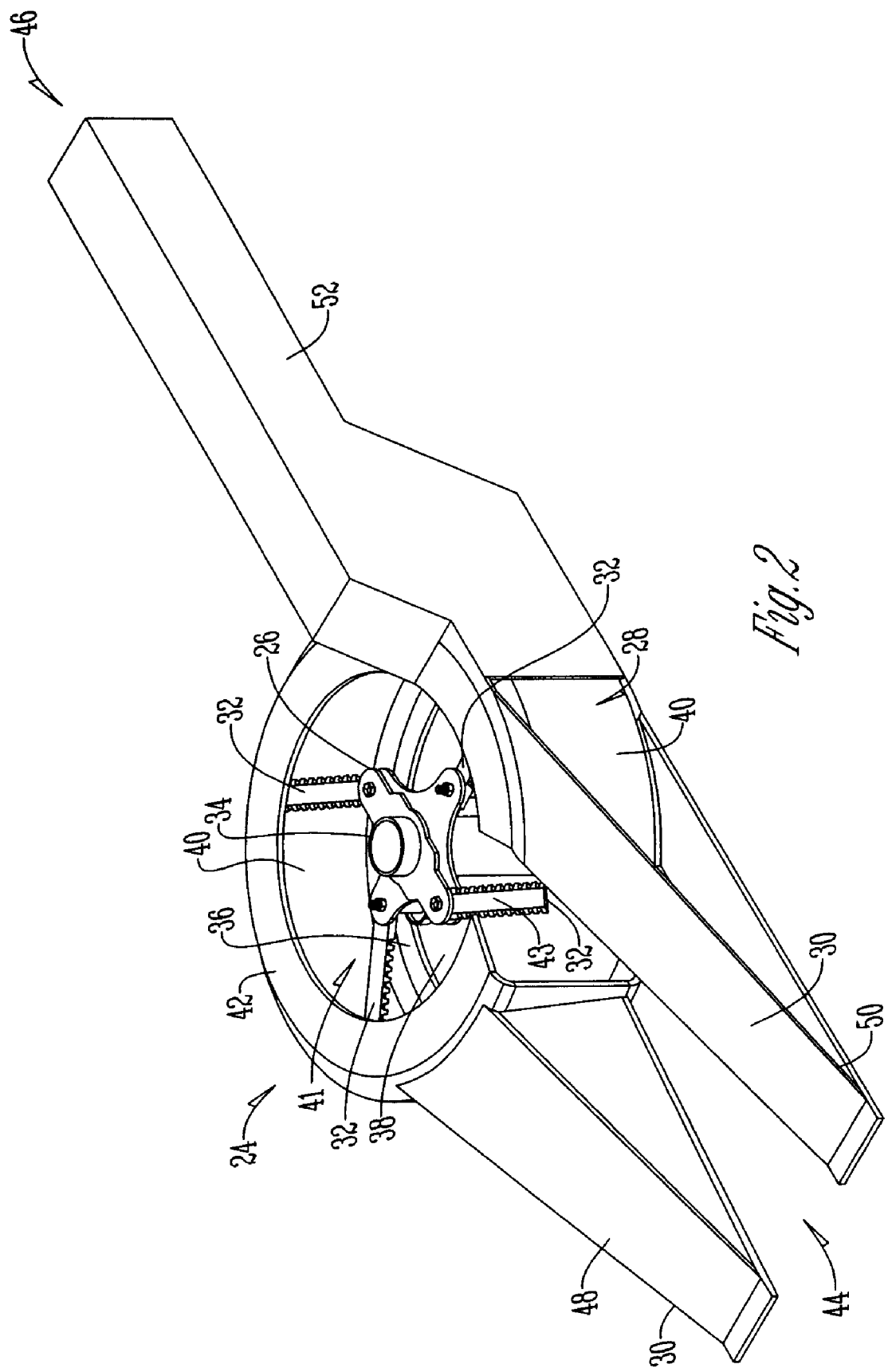
FIG. 2 is a bottom perspective view of a chopper assembly.
Figure 3:
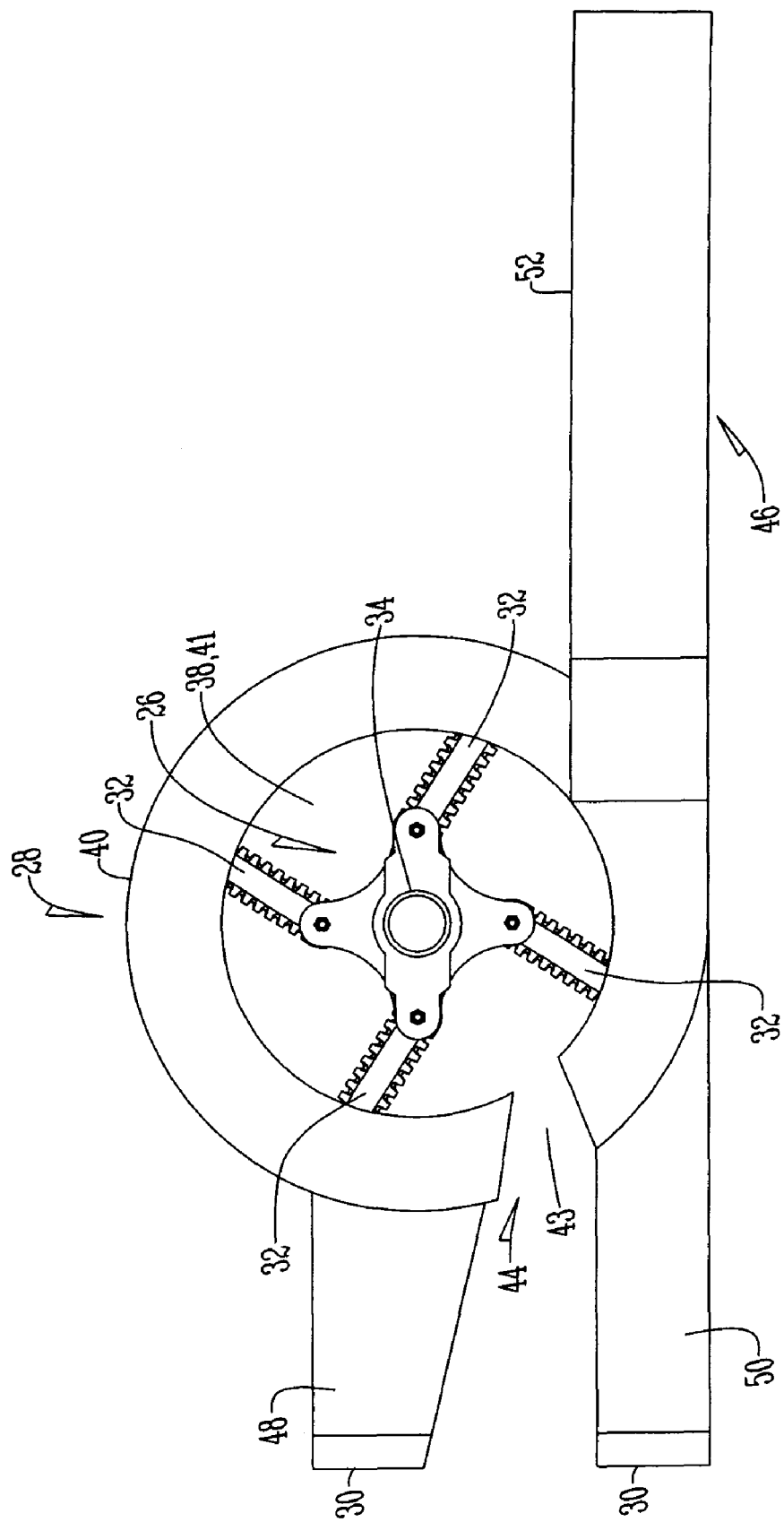
FIG. 3 is a bottom elevational view of a chopper assembly.
Figure 4:
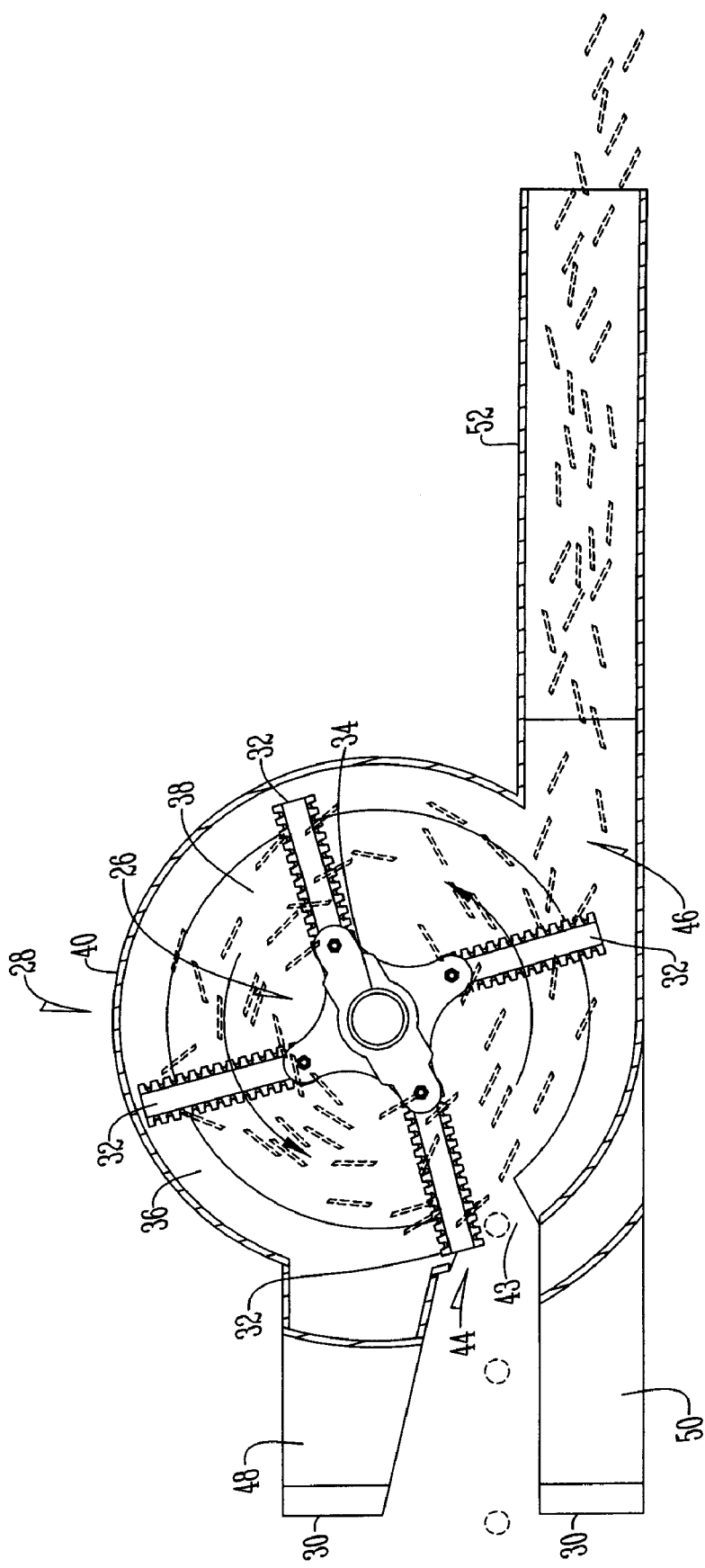
FIG. 4 is a bottom sectional view of a chopper assembly.
Figure 5:
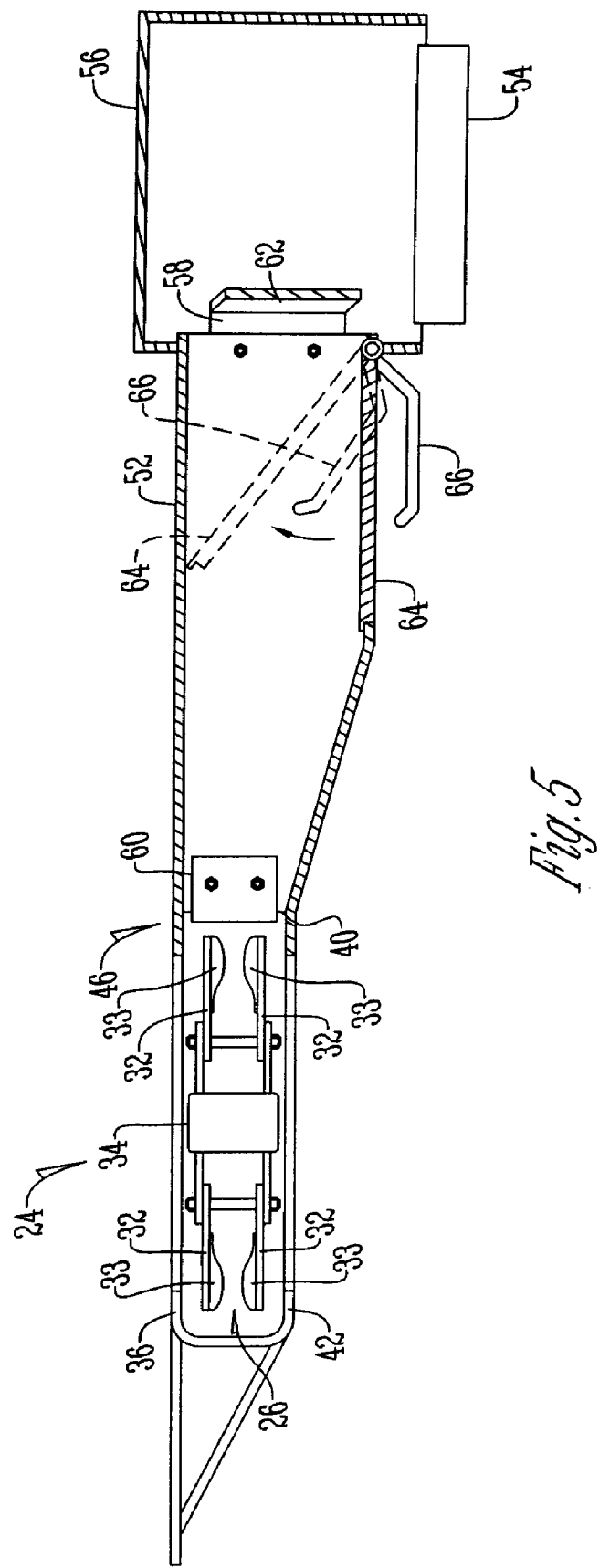
FIG. 5 is a side view in partial cross section of a chopper assembly.

With reference to the figures, a harvesting implement 10, such as a combine, has a corn head 12 carried by the combine. The corn head 12 has a plurality of gathering shoes 14 and a frame 16. Positioned between each pair of adjacent gathering shoes 14 is a picking assembly 18 which has stalk rolls 20 that interact with the cornstalks and ears of corn, and an auger 22 positioned behind the picking assembly 18 to direct the picked corn to a desired location. While preferably the implement picks corn, other crops are contemplated including sunflowers, milo and the like.

The chopping assembly 24 is positioned below and mounted to the corn head 12. The chopping assembly 24 includes a blade assembly 26, a housing 28, and a chopper guide 30. The blade assembly 26 includes a plurality of blades 32 that are attached to and extended outwardly from a drive shaft 34. In one embodiment, the blades 32 lie in more than one generally perpendicular plane in relation to the drive shaft 34. Preferably, each blade 32 has a wing 33 and a sharp cutting edge on both sides making the blades reversible. The drive shaft 34 is connected to a source of power (not shown).

Surrounding the blade assembly 26 is a housing 28. The housing 28 has a top wall 36 connected to the corn head frame 16 with an opening 38 through which the drive shaft 34 extends, an arcuate side wall 40 and a bottom wall 42 having an opening 41 and a slot 43. The side wall 40 has an input port 44 and an output port 46.

The chopper guide 30 includes two elongated members 48, 50. The elongated members 48, 50 are mounted in spaced angled relation to the bottom of the corn head 12 at one end and the bottom of the housing 28 at the opposite end. The angle of the elongated members 48, 50 tapers downwardly and inwardly from the corn head 12 to the housing 28.

Mounted to and in communication with the output port 46 is an outwardly extending exhaust channel or conduit 52. The exhaust channel 52 is adjacent to a conveyor 54 at the end remote from the exhaust port 46.

The conveyor 54 has a removable cover 56 that allows for easy access to the conveyor 54 to unplug or service the conveyor 54. Within the conveyor 54, on the side walls of the cover 56 are guides 58 that direct material on the conveyor 54.

Located at the entrance of the exhaust channel 52 is an adjustable shear plate 60 that is connected to the exhaust channel 52. The adjustable shear plate 60 allows one to adjust the clearance between housing 28 and the exhaust channel 52 to protect and prevent wear of the channel 52. At the opposite end of the channel 52 is a deflector 62 that guides the material toward the center of the combine as material leaves the channel 52. In one embodiment, the walls of the channel 52 are tapered such that the cross section is increasing as material moves toward the discharge end.

In an additional embodiment the channel 52 has a door 64 that is part of the bottom wall of the channel 52. In a normal position, the door 64 lies parallel to the bottom wall. The door is opened by a handle 66 which permits material to fall to the ground when desired.

Figure 6:
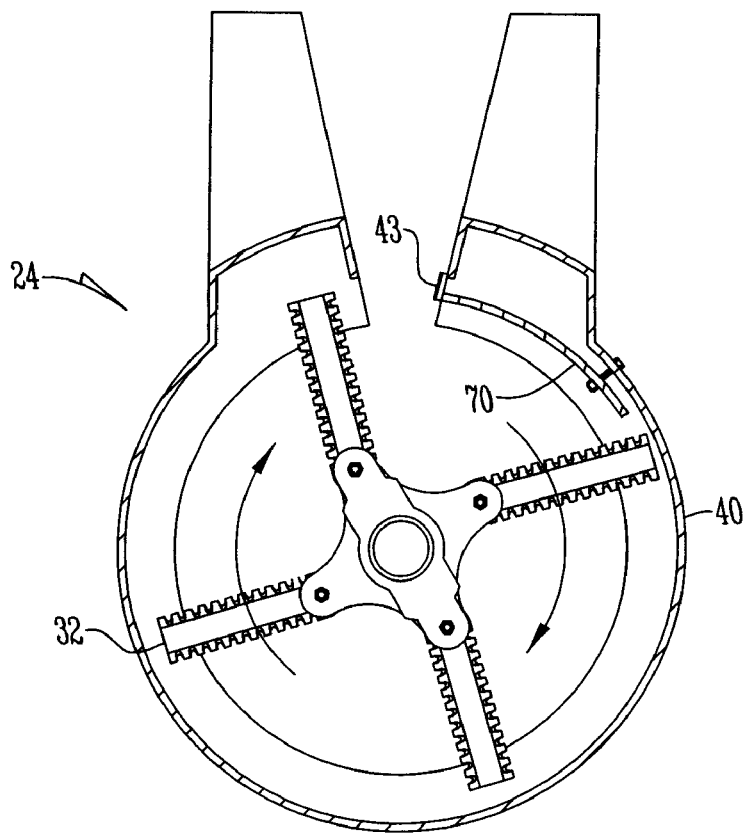
FIG. 6 is a cutaway top plan view of a chopping assembly.

As best shown in FIG. 6 the sidewall 40 of chopping assembly 24 can include an adjustable strike plate 70 adjacent the slot 43. The strike plate is removable and replaceable depending on the desired particular application. For example when the stover is to be used for feed and then needs to be roughed up to provide greater surface area so the stover absorbs a maximum amount of moisture and additives the strike plate used has a roughened surface. Alternatively, when less damaged stover like that used in bedding application is desired, a smooth strike plate 70 is utilized.

The strike plate 70 is positioned to take energy from stalk material entering the chopping assembly 24. By making the strike plate 70 adjustable the clearance between the sidewall 40 and blades 32 can be controlled to ensure stover is not pinned between the wall and blades 32. In addition any damage caused by a rock or broken blade 32 to the strike plate is easily handled because the strike plate can be replaced without replacing the entire housing.

Figure 7:
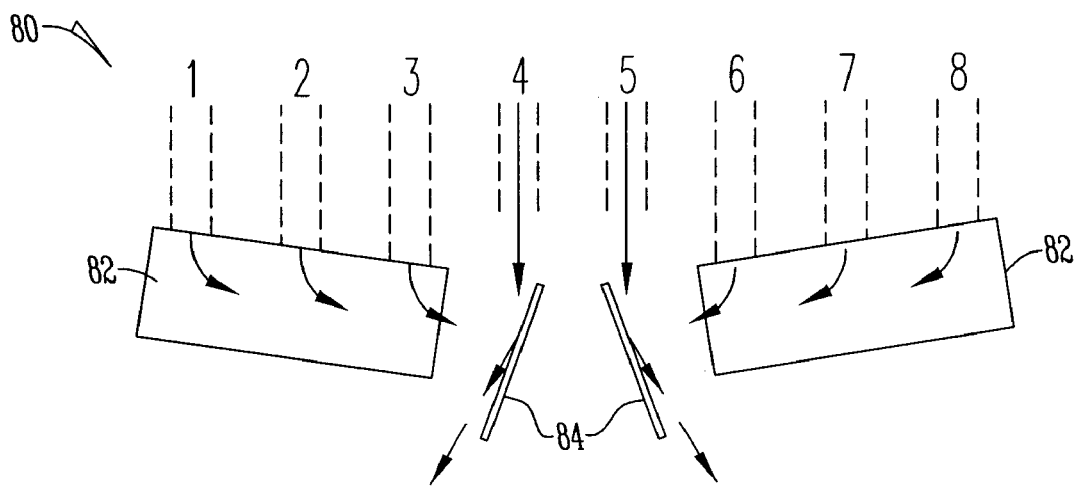
FIG. 7 is a elevated side plan view of a conveyor system for a farm implement.

FIG. 7 shows an improved conveyor system 80 utilized with the chopping assembly 24. The conveyor system 80 utilizes angled conveyors 82 to release the stover material coming out of the exhaust channel 52. Additionally the angled non-perpendicular conveyors widen the windrow as a result of the material not being deposited in a tight line coming off the conveyor. The conveyor system 80 also utilizes a plurality of shields 84 adjacent the end of the angled conveyors 82 to block material coming off of conveyors 82 from landing in the center of the windrow, making a wider windrow and optionally two separate windrows. This assists in the drying of the windrow. Thus the conveyor system 80 provides an internal system that can be used to control the windrow without the need of varying the conveyor speed.

Figure 8:
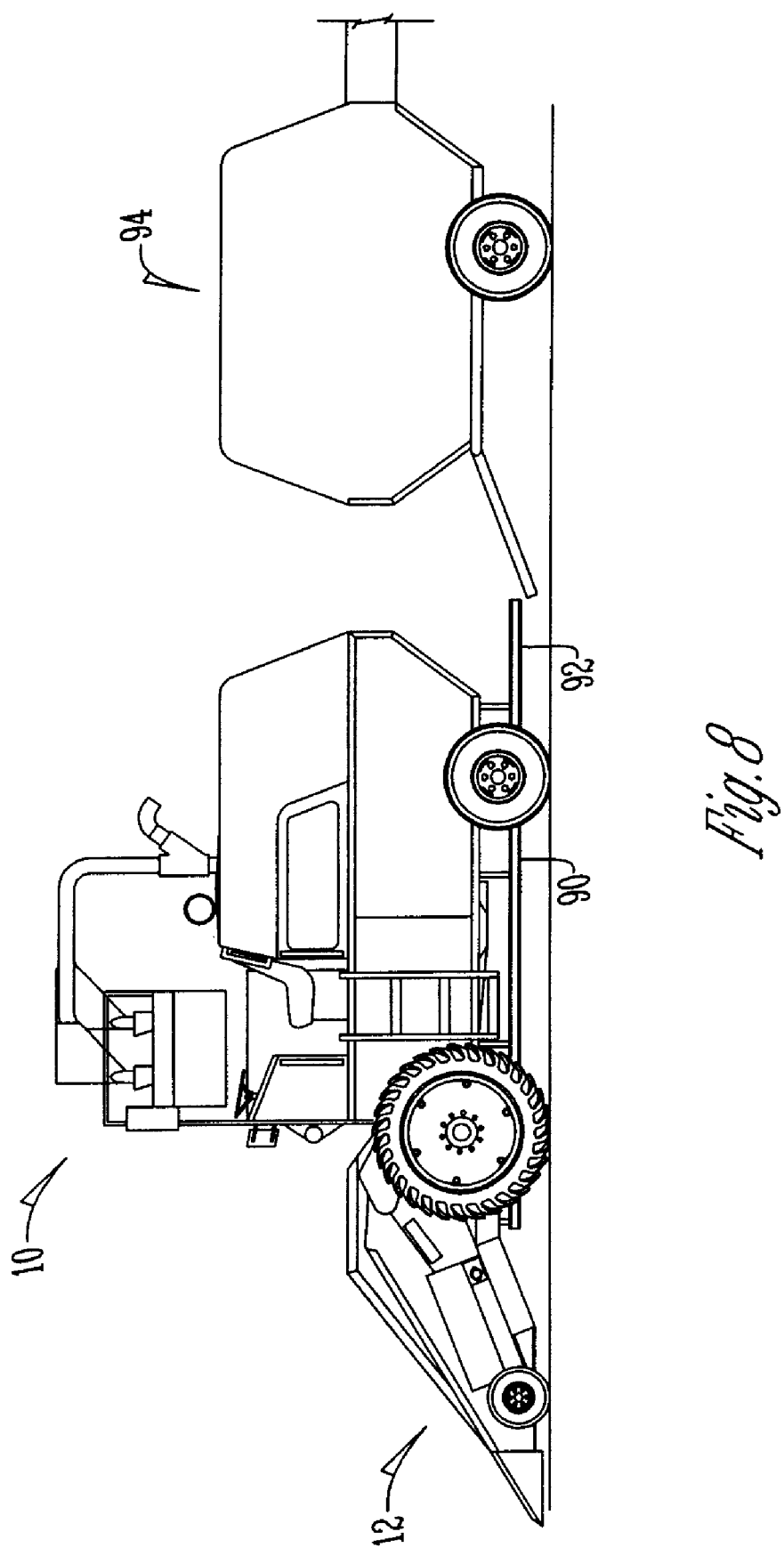
FIG. 8 is a side plan view of a direct bale conveyor for a farm implement.

FIG. 8 shows an alternative embodiment of the harvesting implement 10 that utilizes a direct bale conveyor 90. In this embodiment the harvesting implement has a conveyor 92 that runs under the implement 10 and is positioned to receive the windrow. By having the windrow land on the conveyor 92 that runs under the implement 10 the stover can be moved from the corn head 12 as well as material coming out of the combine to a point at the rear of the implement 10. A secondary processing unit 94 that preferably is a trailing baler can then accept the material on another baler mounted conveyor to be baled without contacting the ground and being contaminated with soil. Thus stover from the head and combine can be provided to the secondary or processing unit 94.

Figure 9:
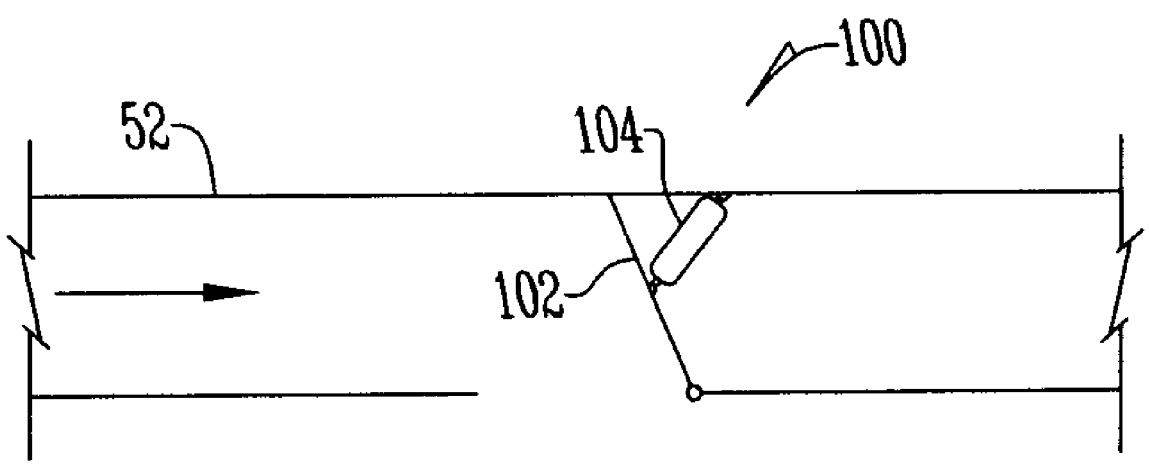
FIG. 9 is a side plan view of a door assembly for a farm implement.

FIG. 9 shows a door controller system 100 that controls a door 64 or 102 associated with exhaust channel 52. The door control system utilizes controllers 103 that have an operating system that can operate manually or utilize a GPS based system that can be utilized by a user in order to control an electric actuator 104 to close and open the door 102. In this manner the operator is able to dump more stover in some areas of the field than others for erosion control purposes as well as insure that the right amount of stover is taken off the field where the crop is heavier or less dense.

Figure 10:
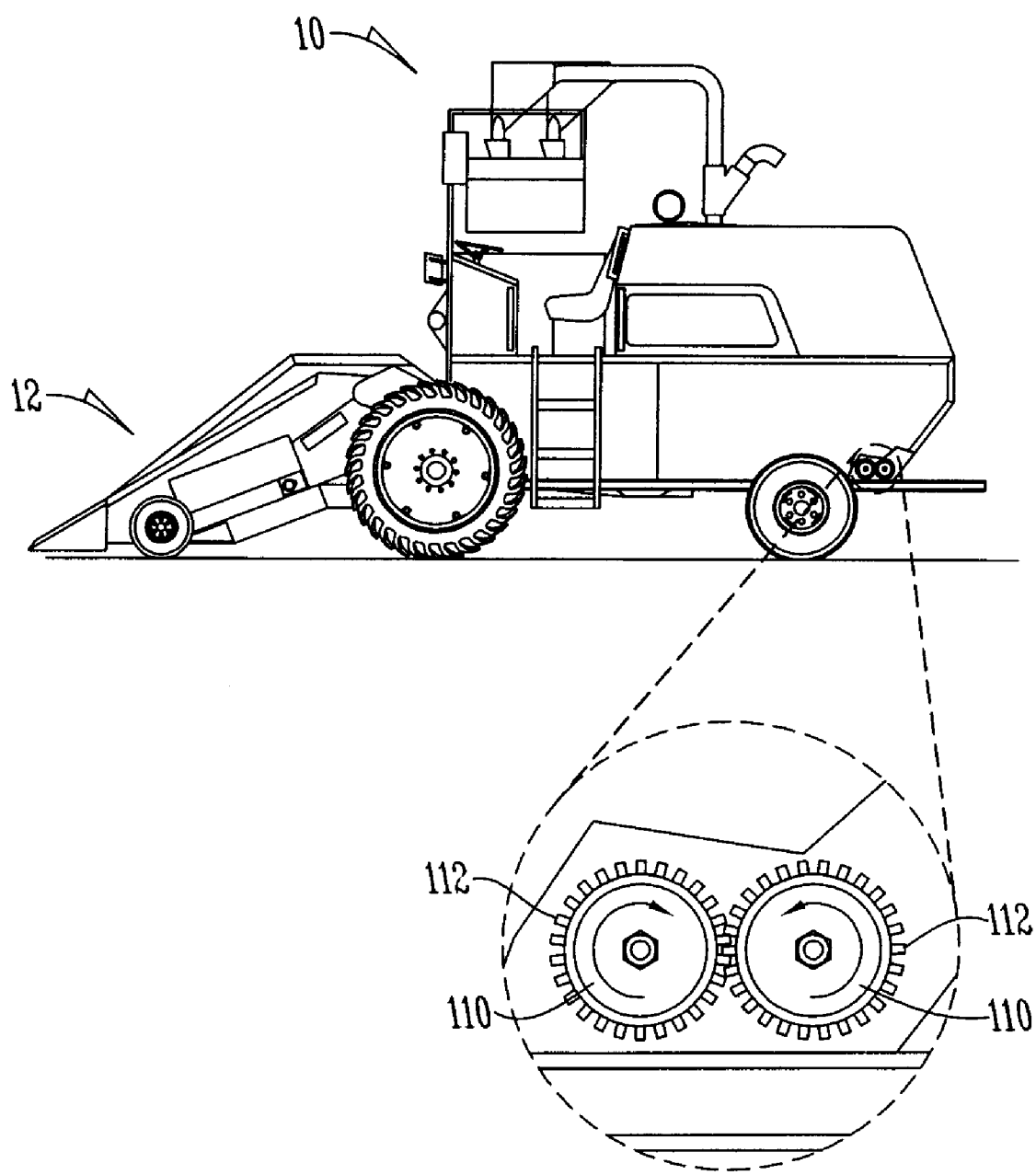
FIG. 10 is a side plan view of a processor roll assembly for a farm implement.

FIG. 10 shows yet another embodiment wherein processor rolls 110 are utilized that contain a plurality of teeth 112 and are positioned at the back of the combine adjacent to where corn cobs are discharged. Specifically the corn cobs discharge into the rolls 110 to be broken into multiple pieces to minimize the amount of whole cobs left in stover that may later need to be removed when the stover is utilized for certain beneficial uses such as cattle feed.

In operation, as the harvesting implement moves forward cornstalks are directed toward the picking assembly 18 by the gathering shoes 14. The picking assembly 18 engages the cornstalk with the stalk rolls 20 to separate the ear of corn from the stalk. The ear of corn is then transported by the auger 22 to its desired location.

As the picking assembly 18 is engaging the stalk to separate the ear of corn from the stalk, the stalk is captured by the elongated guide members 48 and 50 and directed toward the input port 44 of housing 28. As the stalk enters the input port 44 and is captured in the slot 43, the blades 32, which are rotated by drive shaft 34, cut the stalk from its roots and further cuts the stalk into stover. Also, debris from the picking assembly 18 falls through the opening 38 in the top wall 36 and is added to the stover. The rotation of the blades 32 creates a fluid dynamic force that blows the stover, with assistance of the housing 28, out of the output port 46, through the exhaust channel 52 to the conveyor 54. The conveyor 54 transports the stover to a windrow position.

What is claimed is:

1. A chopping assembly for a farm implement, comprising:
   a corn head mounted on a frame;
   a housing mounted to the corn head and having an input port and an outlet port;
   a blade assembly partially disposed within the housing and positioned to cut a crop received within the input port to supply stover to the outlet port;
   an exhaust channel receiving the stover from the outlet port and extending toward an implement conveyor;
   the implement conveyor positioned to receive stover from the exhaust channel at an angle; and
   wherein the exhaust channel has an automatic door associated therewith electrically connected to a controller to prevent stover from reaching the conveyor.

2. The assembly of claim 1 further comprising a shield adjacent the conveyor preventing the stover from landing uncontrolled in the windrow when coming off the conveyor.

3. The assembly of claim 2 further comprising a processor roll having a plurality of teeth at an end of the implement adjacent the windrow to break up corn cobs.

4. The assembly of claim 2 wherein the windrow is positioned at an angle to the conveyor.

5. The assembly of claim 1 wherein the controller utilizes a global positioning system to determine when to actuate the door.

6. A chopping assembly for a farm implement, comprising:
   a corn head mounted on a frame;
   a housing having a top wall and a side wall wherein the top wall is mounted to a bottom surface of the corn head and the side wall has an input port and an output port;
   a blade assembly partially disposed within the housing and positioned to cut a crop received within the input port to supply stover to the output port,
   an exhaust channel receiving the stover from the output port mounted to and extending outwardly from the housing toward an implement conveyor wherein the exhaust channel has walls which extend outwardly and rearwardly from an exhaust channel entrance mounted in communication with the output port of the housing to a discharge end adjacent an implement conveyor;

wherein the implement conveyor is positioned to extend across and receive stover from discharge ends of a plurality of exhaust channels to convey stover toward a center of a harvesting implement.

7. The assembly of claim 6 wherein the conveyor extends laterally at an angle across the corn head from a first end adjacent an outside side edge of the corn head to a second end within an interior of the corn head.

8. The assembly of claim 7 additionally comprising a shield positioned adjacent the second end of the conveyor such that the shield blocks stover coming off the conveyor from landing in a center of a windrow.

9. The assembly of claim 8 additionally comprising a second conveyor positioned to extend across and receive stover from discharge ends of a plurality of exhaust channels to convey stover toward the center of a harvesting implement.

10. The assembly of claim 9 wherein the second conveyor extends laterally at an angle across the corn head from a first end adjacent an opposite outside side edge of the corn head to a second end within the interior of the corn head.

11. The assembly of claim 10 additionally comprising a second shield positioned adjacent the second end of the second conveyor such that the second shield blocks stover coming off the second conveyor from landing in a center of a windrow.

* * * * *